(12) United States Patent
Aoulad Ali et al.

(10) Patent No.: US 9,178,559 B2
(45) Date of Patent: Nov. 3, 2015

(54) METHOD AND SYSTEM OF CALIBRATION OF A SECOND ORDER INTERMODULATION INTERCEPT POINT OF A RADIO TRANSCEIVER

(75) Inventors: Karim Aoulad Ali, Orleans (FR);
Patrick Ozenne, Benouville (FR);
Philippe Barré, Le Fresne Camilly (FR);
Hervé Jacob, Saint-Contest (FR)

(73) Assignee: ST ERICSSON SA, Geneva (CH)

( * ) Notice: Subject to any disclaimer, the term of this patent is extended or adjusted under 35 U.S.C. 154(b) by 615 days.

(21) Appl. No.: 13/139,128

(22) PCT Filed: Nov. 25, 2009

(86) PCT No.: PCT/EP2009/065811
§ 371 (c)(1),
(2), (4) Date: Aug. 26, 2011

(87) PCT Pub. No.: WO2010/066579
PCT Pub. Date: Jun. 17, 2010

(65) Prior Publication Data
US 2011/0299575 A1   Dec. 8, 2011

(30) Foreign Application Priority Data
Dec. 12, 2008  (EP) .................................. 08305928

(51) Int. Cl.
*H03D 1/04*   (2006.01)
*G02F 1/03*   (2006.01)
(Continued)

(52) U.S. Cl.
CPC . *H04B 1/525* (2013.01); *H04B 1/10* (2013.01)

(58) Field of Classification Search
CPC .......... H04B 1/525; H04B 15/00; H04B 1/10; H04B 1/123

USPC ........................................... 375/346; 359/245
See application file for complete search history.

(56) References Cited

U.S. PATENT DOCUMENTS 6,426,680 B1 * 7/2002 Duncan et al. .................. 331/34
7,043,208 B2  5/2006 Nigra
(Continued)

FOREIGN PATENT DOCUMENTS

NL  WO2007113733  * 10/2007
WO    03/079573 A1    9/2003
(Continued)

OTHER PUBLICATIONS

Weigel et al, "Adaptive IP2 calibration scheme for direct-conversion receivers" IEEE, 2006.*

(Continued)

*Primary Examiner* — Chieh M Fan
*Assistant Examiner* — Sarah Hassan
(74) *Attorney, Agent, or Firm* — Patent Portfolio Builders PLLC

(57) ABSTRACT

The method of calibration of a second order intermodulation intercept point (IIP2) of a radio transceiver comprises the steps of: generating a second order intermodulation (IM2) reference signal ($S_{TXIM2-REF}$) from a transmission baseband signal ($S_{TXBB-REF}$); estimating a second order intermodulation power from the second order intermodulation reference signal ($S_{TXIM2-REF}$) and a radio transceiver output signal (Output); tuning a second order intermodulation intercept point tuner to find a lowest second order intermodulation power; extracting an optimum second order intermodulation intercept point corresponding to the lowest second order intermodulation power.

16 Claims, 2 Drawing Sheets

Figure 1:
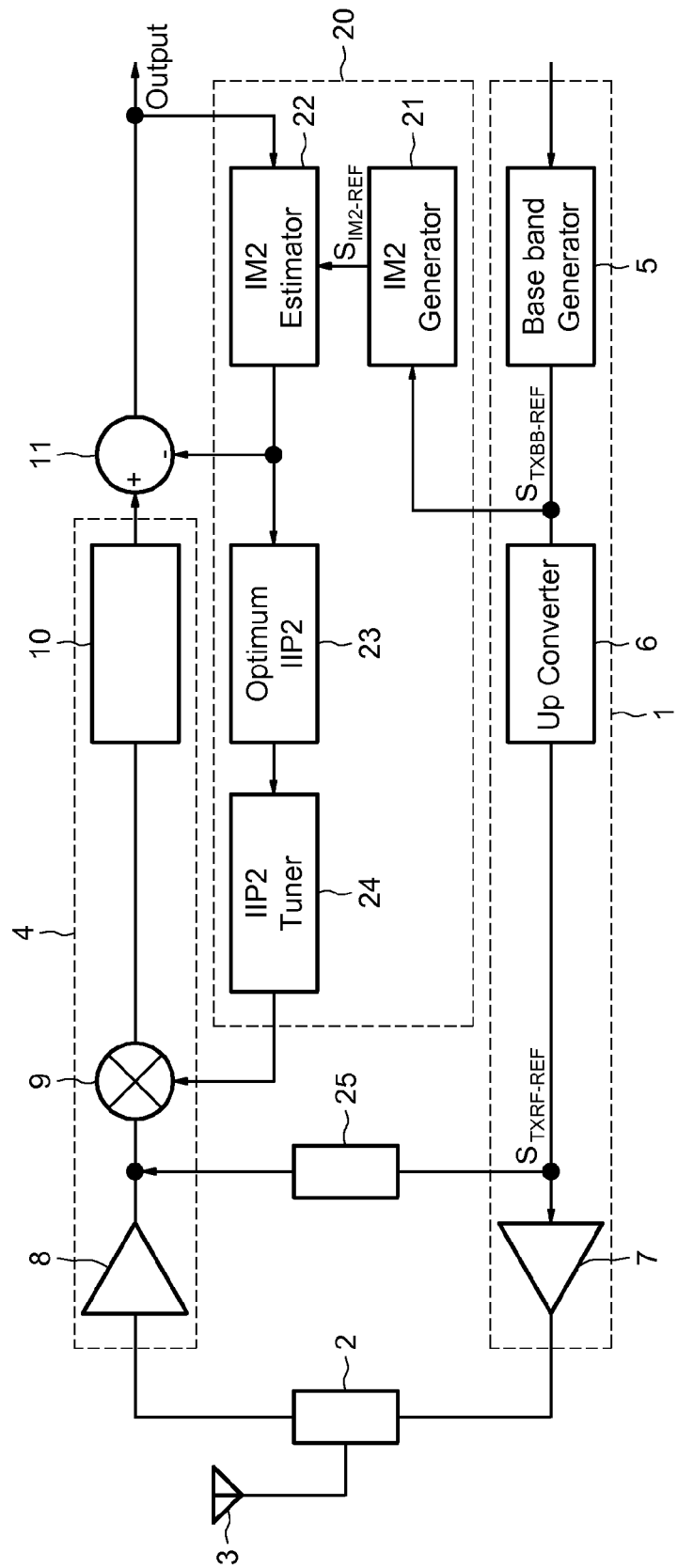

(51) Int. Cl.
 *H03L 7/00* (2006.01)
 *H04B 1/525* (2015.01)
 *H04B 1/10* (2006.01)

(56) References Cited

U.S. PATENT DOCUMENTS

| | | |
|---|---|---|
| 2001/0007151 A1* | 7/2001 | Vorenkamp et al. ........... 725/151 |
| 2002/0047942 A1* | 4/2002 | Vorenkamp et al. ........... 348/731 |
| 2002/0050861 A1* | 5/2002 | Nguyen et al. ................. 330/254 |
| 2003/0020544 A1* | 1/2003 | Behzad .......................... 330/254 |
| 2003/0122619 A1* | 7/2003 | Ishida et al. ................. 330/124 R |
| 2003/0124999 A1* | 7/2003 | Parssinen et al. ............ 455/226.1 |
| 2004/0151238 A1 | 8/2004 | Masenten |
| 2007/0072575 A1* | 3/2007 | Sowlati et al. ................. 455/318 |
| 2007/0184782 A1 | 8/2007 | Sahota et al. |
| 2008/0032646 A1* | 2/2008 | Huang et al. ................... 455/131 |
| 2008/0182537 A1 | 7/2008 | Manku et al. |
| 2009/0203347 A1* | 8/2009 | Kaczman et al. ............. 455/326 |
| 2009/0316826 A1* | 12/2009 | Koren et al. ................... 375/296 |
| 2010/0093298 A1* | 4/2010 | Pratt et al. .................. 455/226.1 |

FOREIGN PATENT DOCUMENTS

| | | |
|---|---|---|
| WO | 2007/113733 A2 | 10/2007 |
| WO | 2008/089574 A1 | 7/2008 |

OTHER PUBLICATIONS

Krzysztof Dufrene et al., "Adaptive IP2 Calibration Scheme for Direct-Conversion Receivers," 0-7803-9412-7, copyrighted 2006, IEEE, pp. 111-114.

Krzysztof Dufrene et al., "A 0.13μm 1.5V CMOS I/Q Downconverter with Digital Adaptive IIP2 Calibration," 1-4244-0852-0/07, 2007 IEEE International Solid-State Circuits Conference, copyrighted 2007, IEEE, pp. 86-87 and 589.

Hooman Darabi et al., "An IP2 Improvement Technique for Zero-IF Down-Converters," 1-4244-0079-1/06, 2006 IEEE International Solid-State Circuits Conference, copyrighted 2006, IEEE, entire document.

International Search Report issued in International Application No. PCT/EP2009/065811, mailed on Feb. 9, 2010.

* cited by examiner

METHOD AND SYSTEM OF CALIBRATION OF A SECOND ORDER INTERMODULATION INTERCEPT POINT OF A RADIO TRANSCEIVER

The present invention is related to wireless communication devices, and more particularly to a dynamic second order intercept point calibration enabling a second order interference reduction in direct conversion receivers.

Direct conversion receiver (DCR) architecture is widely used in modern wireless communication systems essentially for its high integration level, resulting in a lower cost and smaller size. For example, DCR architecture such as zero intermediate frequency (ZIF) architecture is currently chosen for a radio receiver of third generation wideband code division multiple access (3G WCDMA) handset, or universal mobile telecommunication system (UMTS) handset.

The main difficulties of direct conversion receivers are baseband co-located noises essentially linked to flicker noise, direct current offsets and second order intermodulation distortion (IM2), which all corrupt the desired signal and strongly degrade the receiver sensitivity. Flicker noise and direct current offsets can be mitigated by high pass filtering in wideband applications. Conversely, IM2 distortion still remains the most critical phenomena in such applications.

Major IM2 contributions come from down conversion mixers, especially due to nonlinearities and mismatches in parts of its differential structure. They are essentially generated in the front-end mixers and occupy the same frequency band as the desired signal. IM2 power linked to any interferer depends on its power level and second order intercept point (IP2) level, which indicates a figure of merit for IM2 distortion compensation.

For instance, in 3G WCDMA full duplex (FDD) receivers, the main difficulty is linked to IM2 distortion generated by the transmitter signal leakage. Moreover, 3G transceivers would need to get a new second order intermodulation intercept point (IIP2), as the 3G transceivers are getting more and more complex with, for instance, multi-band, multi-standard, multi-mode.

The calibration problem is more critical in portable devices as calibration techniques need signal processing from a digital signal processor (DSP) chip, whose calculation power and availability is strongly limited.

An automated calibration technique has been developed and offers a fast calibration but only when the mobile device is switched on. Moreover, temperature and frequency dependencies tend to decrease the performance level of the calibration point.

For example, in a 3G WCDMA FDD operation mode, an external duplexer is needed to separate reception from transmission. A transmitter leakage due to limited finite duplexer isolation between transmission and reception appears into the input of the receiver. It is the main cause of second order intermodulation distortion. At the receiver's baseband, this corresponds to a squared version of the transmission signal envelope, and occupies twice the bandwidth of the transmission amplitude envelope, contributing thereby to the sensitivity degradation of the receiver.

Turning to the prior art, US 2004 0 203 458 presents a method and apparatus to reduce second order interference in a communication device. It presents a technique to compensate the interference by signal processing.

However, this document presents a method to reduce intermodulation distortion caused by transmission leakage only. Therefore, for instance, second order non-linearity linked to the adjacent channel in WCDMA is not removed by this method.

Moreover, transceivers are becoming more and more complex and with it signal cohabitation is also becoming more complex.

In view of the foregoing, it is hereby proposed to reduce general intermodulation distortion and to achieve a high second order intercept point requirement by dynamically calibrating the second order intercept point and even when the device is operating.

In an aspect, it is proposed a method of calibration of a second order intermodulation intercept point of a radio transceiver.

This method comprises the steps of:
Generating a second order intermodulation (IM2) reference signal from a transmission baseband signal;
Estimating a second order intermodulation power from the second order intermodulation reference signal and a radio transceiver output signal;
Tuning the generated second order intermodulation intercept point to correspond to a lowest second order intermodulation power;
Extracting an optimum second order intermodulation intercept point corresponding to the lowest second order intermodulation power found.

According to a first feature, the second order intermodulation reference signal is preferably generated by an ideal square-law process of the transmission baseband signal.

It is generally admitted that the second order intermodulation effect can be represented by a square-law process of the following type:

$$\alpha \cdot |S_{TXBB-REF}|^2$$

Where $|S_{TXBB-REF}|$ represents the magnitude of the time varying complex signal envelope of the transmission baseband signal, and $\alpha$ is a coefficient proportional to the second order intercept point.

According to a second feature, the second order intermodulation power can advantageously be estimated with adaptive filtering means.

For example, to estimate the second order intermodulation power, the adaptive filtering means extracts the second intermodulation signal included in the radio transceiver output signal by a convolution of the second order intermodulation reference signal with the radio transceiver output signal.

In another aspect, it is proposed a method of suppression of second order intermodulation of reception means of a radio transceiver.

According to one general feature of this method, it comprises the step of:
Injecting a transmit radiofrequency signal from an up converter of a transmitter into a mixer of reception means;
Generating a second order intermodulation (IM2) reference signal from a transmission baseband signal;
Estimating a second order intermodulation power from the second order intermodulation reference signal and a radio transceiver output signal;
Tuning the second order intermodulation intercept point to correspond to a lowest second order intermodulation power;
Extracting an optimum second order intermodulation intercept point corresponding to the lowest second order intermodulation power;
Subtracting the second order intermodulation signal extracted from the radio transceiver output signal to the radio transceiver output signal.

The transmit radiofrequency signal is used here as a test signal for the second order intermodulation power estimation.

The complex envelope of the transmission leakage signal experiences some distortion, essentially through the amplifier and the duplexer's isolation. Therefore the transmission leakage signal can not be similar to the original transmit baseband signal, and strongly risks to degrade the estimation means performances based in a correlation level between these two complex envelopes. Moreover, the power of the transmission leakage signal varies in accordance with the WCDMA communication standard. This is a reason why, to overcome these restraints for the signal correlation of the estimator, a part of the transmission signal of constant power is injected to the mixer input of the reception means.

The transmission leakage signal is uncorrelated from the transmission signal. As the quality of this uncorrelation impacts on the quality of the estimation, the transmission reference signal can be encoded if ever the transmission leakage signal is found to be correlated with the transmission signal.

According to another feature, the steps of estimating the IM2 power, tuning the second order intermodulation intercept point, and extracting the optimum second order intermodulation intercept point are carried out in a closed loop.

Using the transmit radio frequency signal as a test signal for suppressing second order intermodulation and using a closed loop for optimum control enables to continuously adjust the calibration while the wireless communication device is working, compensating therefore the slow progressive degradation essentially due to low oscillation frequencies and temperature variations.

Advantageously, the transmit radio frequency signal injected into the mixer of the reception means can be modified according to the gain parameters of the radio transceiver.

According to yet another feature, the reception means can include a direct conversion receiver.

In a third aspect, it is proposed a system of calibration of a second order intermodulation intercept point of a radio transceiver.

This system comprises generating means to generate a second order intermodulation reference signal from a transmission baseband signal, estimating means to estimate the second order intermodulation power from the second order intermodulation reference signal and a radio transceiver output signal, extracting means to extract an optimum second order intermodulation intercept point corresponding to a lowest second order intermodulation power.

Advantageously, the generating means includes means to process square-law of the transmission baseband signal.

The estimating means may include adaptive filtering means.

Advantageously, the adaptive filtering means comprises means to calculate a convolution of the second order intermodulation reference signal with the radio transceiver output signal.

In a fourth aspect, it is proposed a system of suppression of second order intermodulation of reception means of a radio transceiver.

The system includes injecting means to inject a transmit radiofrequency signal from an up converter of a transmitter into a mixer of reception means, generating means to generate a second order intermodulation reference signal from a transmission baseband signal, estimating means to estimate the second order intermodulation power from the second order intermodulation reference signal and a radio transceiver output signal, extracting means to extract an optimum second order intermodulation intercept point corresponding to a lowest second order intermodulation power found, subtraction means to subtract the second order intermodulation signal extracted from the radio transceiver output signal to the radio transceiver output signal.

The system may further include a closed loop including the estimating means, the calibrating means and the second order intermodulation intercept point tuner.

Advantageously, the injecting means can modify the transmit radiofrequency signal injected into the mixer of the reception means according to the gain parameters of the radio transceiver.

The reception means can advantageously include a direct conversion receiver.

Figure 2:
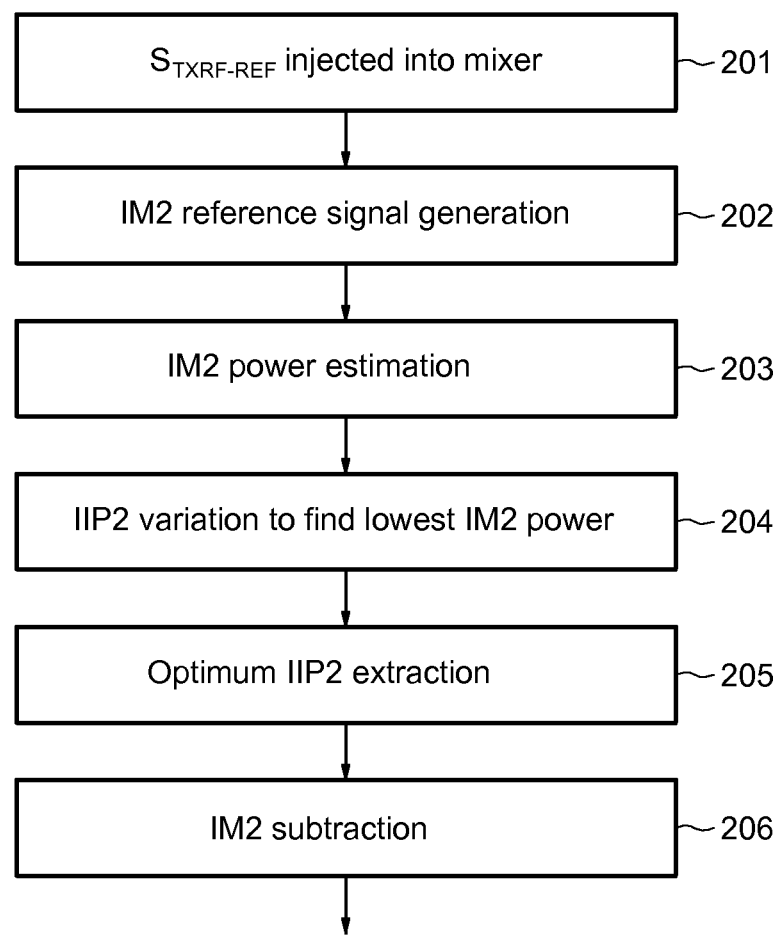

Other advantages and characteristics of the invention will become apparent from the examination of the detailed description, being in no way limiting, and of the appended drawings on which:

FIG. 1 presents a block diagram of a radio transceiver including an embodiment of a system of suppression of second order intermodulation;

FIG. 2 is a logic flow diagram that illustrates an embodiment of a method of suppression of second order intermodulation.

FIG. 1 presents a block diagram of a wireless communication device such as a radio transceiver including an embodiment of a system of suppression of second order intermodulation.

The present system is equally applicable to analog and digital signals. Signals may be in digital or analog form and in some cases can be real or complex, i.e. separate signal components representing the real and imaginary parts. The digital, analog or complex nature of a signal has no impact on the general processing concepts described herein.

The radio transceiver includes transmitting means 1 able to transmit a radio frequency signal to another radio transceiver through a duplexer 2 coupled to an antenna 3, and reception means 4 able to receive through the duplexer 2 coupled to the antenna 3 a radiofrequency signal emitted by another radio transceiver.

Transmit data are provided to a baseband generator 5, such as a digital signal processor. The baseband generator produces the actual complex modulation envelope signal for the transmitting means 1, locally available as the transmission baseband signal $S_{TXBB-REF}$ in a direct conversion radio, for example. The transmit baseband signal modulates the transmit carrier through a frequency up converter 6 to produce a transmit radio frequency signal $S_{TXRF-REF}$. The transmit radio frequency signal is amplified by a power amplifier 7, and is injected into duplexer 2 and sent out by means of the antenna 3.

At the transmission side, some of the transmit radio frequency signal will find its way to the reception means 4 input as interference, due to finite isolation between separate antennas or the use of a single antenna for both transmitting means 1 and the affected reception means 4. This transmission leakage signal will lead to the formation of second order intermodulation in the signal received by the reception means 4 at the reception side.

The transmission leakage signal passes through and is modified by the front end of the reception means 4, including a low noise amplifier 8. At this point, the complex envelop of the transmission leakage signal has experienced some distortion, both non-linear and linear.

After passing through the low noise amplifier 8, the transmission leakage signal is injected into a mixer 9. The signal is then filtered using filtering means 10 to filter and amplify the signal which is passing there through.

In this embodiment, a second order intermodulation intercept point (IIP2) calibration system 20 is implemented to the radio transceiver.

The IIP2 calibration system 20 includes generating means 21 to generate a second order intermodulation reference signal $S_{IM2-REF}$ from a transmission baseband signal $S_{TXBB-REF}$, estimating means 22 to estimate the second order intermodulation power from the second order intermodulation reference signal $S_{IM2-REF}$ and a radio transceiver output signal, a second order intermodulation intercept point tuner 24, and extracting means 23 to extract an optimum second order intermodulation intercept point corresponding to a lowest second order intermodulation power.

Generating means 21 generates a second order intermodulation reference signal $S_{IM2-REF}$ from the transmission baseband signal $S_{TXBB-REF}$. The second order intermodulation reference signal $S_{IM2-REF}$ is generated by an ideal square-law process of the transmission baseband signal $S_{TXBB-REF}$.

It is theoretically admitted that the second order intermodulation effect can be represented by an ideal square-law process of the following type:

$$\alpha \cdot |S_{TXBB-REF}|^2$$

Where $|S_{TXBB-REF}|$ represents the magnitude of the time varying complex signal envelope of the transmission baseband signal, and $\alpha$ is a coefficient proportional to the second order intercept point.

The second order intermodulation reference signal $S_{IM2-REF}$ generated by the generating means 21 is injected into estimating means 22 which also receives in input a radio transceiver output signal Output.

To estimate the second order intermodulation power of the second order intermodulation signal comprised in the radio transceiver output signal, the estimating means 22 uses adaptive filtering means. For instance, an adaptive transversal filter using a least mean squared adaptive control algorithm could be used in this embodiment.

The adaptive filtering means extracts the second intermodulation signal included in the radio transceiver output signal by convoluting the second order intermodulation reference signal $S_{IM2-REF}$ with the radio transceiver output signal Output, and adjusting its filtering parameters applied to the second order intermodulation reference signal $S_{IM2-REF}$ through an adaptive control algorithm.

Having extracted the second order intermodulation signal included in the radio transceiver output signal Output using the adaptive means, the estimating means 22 thus estimate the power of the second order intermodulation signal.

The power of the second order intermodulation signal, and in particular the power of the low frequency IM2 signal, is linked to the second order intermodulation intercept point by the following equation:

$$P_{IM2} = 2 \cdot (P_{TXRF-REF} - 3) - \text{IIP2} + K_{TX}$$

Where:

$P_{IM2}$ represents the power of the second order intermodulation signal, $P_{TXRF-REF}$ represents the power of the transmit radiofrequency reference signal, IIP2 represents the second order intermodulation intercept point, and $K_{TX}$ is a corrective factor which takes into account that the transmit radiofrequency reference signal $S_{TXRF-REF}$ is not a two tones but a bandwidth signal.

Therefore, the real second order intermodulation intercept point can be extracted from the estimation of the power of the second order intermodulation by the extracting means 23.

With the real IIP2 extracted, the extracting means 23 starts running the calibration of the mixer in collaboration with the second order intermodulation intercept point tuner 24 using an algorithm intended to change the code of the IIP2 tuner 24 and to measure whether the second order intermodulation power has risen or has been lowered. Once the IIP2 tuner code corresponding to the lowest IM2 power has been found, it is considered that the IIP2 with the highest level has been found. This IIP2 is thus extracted. Meanwhile, the IIP2 tuner 24 keeps the code corresponding to the lowest IM2 power, optimising therefore the calibration of the mixer 9 formed by the IIP2 tuner 24 which can be used as an impedance network coupled with a mixer to stabilize the asymmetry present in the mixer 9 and to cause the second order intermodulation.

To calibrate the second order intermodulation while the mobile is working and therefore suppress the second intermodulation present in the output signal with the best efficiency, a calibration of the mixer 9 and an estimation of the second intermodulation is made with a transmit radiofrequency reference signal $S_{TXRF-REF}$ as a test signal.

A part of the transmit radiofrequency reference signal $S_{TXRF-REF}$ generated by the up converter 6 of the transmission means 1 is injected thanks to injecting means 25 into the mixer 9 of the reception means which is in this embodiment a direct conversion receiver. The transmit radiofrequency reference signal $S_{TXRF-REF}$ is used here as a test signal for the second order intermodulation power estimation.

The complex envelope of the transmission leakage signal experiences some large amplitude and phase distortion, essentially through the amplifier and the duplexer's isolation. The transmission signal generated by the transmission means 1 operates in a frequency bandwidth which the duplexer 2 is supposed to reject, and prevent the transmission signal from passing through towards the reception means 4. It is therefore a frequency window in the slope of the isolation response, and thus the isolation is strongly dependant on the frequency. Therefore, the transmission leakage signal can not be similar to the original transmit baseband signal, and strongly risks to degrade the estimation means performances based in a correlation level between these two complex envelopes.

Moreover, the power of the transmission leakage signal varies in accordance with the control by the base station as defined in the WCDMA communication standard. This is a reason why, to overcome these restraints for the signal correlation of the estimator, a part of the transmission radiofrequency signal of constant power is injected to the mixer 9 input of the reception means 4 through injection means 25.

For example, when a mobile phone comprising such a radio transceiver is very close to the base station, a low power of transmission will be requested, and this base station may transmit a high power level towards other mobile phones in the neighbouring channels. Using an transmit radiofrequency reference signal $S_{TXRF-REF}$ as an input of the mixer 9 will create a significant second order intermodulation, and thus enable an accurate second order intercept point calibration, that will cancel the second order intermodulation interference signals generated by the base station transmission signals in the neighbouring channels.

This is major advantage as these second order intermodulation interference will be output within the reception channel after the down mixer. In many practical designs of receiver chains, a switchable operating current of a mixer is implemented; an adjustment of the gain of this injection can be controlled depending on this mixer operation point, that sets an optimum power level of the test signal high enough for the accuracy of the calibration process, and low enough to cancel the second order intermodulation down to a level well below the desired received signal after the convergence of the calibration process.

The transmission leakage signal is uncorrelated from the transmission signal. As the quality of this uncorrelation impacts on the quality of the estimation, the transmission radiofrequency reference signal $S_{TXRF-REF}$ can be encoded if ever the transmission leakage signal is found to be correlated with the transmission signal.

Using a part of the transmit radiofrequency reference signal instead of the transmission leakage signal as a test signal, avoids from having to add a filter before the reception means input.

Thus, the radio transceiver output signal Output is correlated with the second order intermodulation reference signal $S_{IM2-REF}$ enabling an efficient estimation of the power of the second order intermodulation signal included in the radio transceiver output signal Output.

After extraction of the second order intermodulation signal from the radio transceiver output signal Output using the adaptive filtering means, the signal is subtracted from the output signal of the reception means 4 by means of the subtracting means 11. The mixer 9 having been calibrated by IIP2 tuner 24, the lowest second order intermodulation power can thus be found.

Reference is now made to FIG. 2 illustrating a logic flow diagram showing an embodiment of a method of suppression of second order intermodulation.

In a first step 201, a part of a transmit radiofrequency signal $S_{TXRF-REF}$ generated by an up converter 6 of transmission means 1 is injected into a mixer 9 of reception means 4. In a following step 202, a second order intermodulation reference signal $S_{IM2-REF}$ is generated from a transmission baseband signal $S_{TXBB-REF}$.

Then, in a next step 203, a second order intermodulation power is estimated from the second order intermodulation reference signal $S_{IM2-REF}$ and a radio transceiver output signal Output using adaptive filtering means.

In a subsequent step 204, the code of a second order intermodulation intercept point tuner 24 is modified to find a lowest second order intermodulation power.

An optimum second order intermodulation intercept point corresponding to the lowest second order intermodulation power found is then extracted by the extracting means 23 (step 205), enabling therefore to calibrate the mixer with the code found for the IIP2 tuner 24 of the optimum second order intermodulation intercept point corresponding to the lowest power of second order intermodulation found.

Finally, in a step 206, the second order intermodulation signal extracted from the radio transceiver output signal Output using the adaptive filtering means included in the estimating means 22 is subtracted to the reception output signal thanks to subtracting means 11.

The invention claimed is:

1. Method of calibration of a second order intermodulation intercept point of a radio transceiver, the method comprising:
   generating a second order intermodulation reference signal from a transmission baseband signal;
   estimating a second order intermodulation power from the second order intermodulation reference signal and a radio transceiver output signal;
   tuning a second order intermodulation intercept point tuner to correspond to a lowest second order intermodulation power; and
   extracting an optimum second order intermodulation intercept point corresponding to the lowest second order intermodulation power.

2. Method as claimed in claim 1, wherein the second order intermodulation reference signal is generated by square-law process of the transmission baseband signal.

3. Method as claimed in claim 1, wherein the second order intermodulation power is estimated with adaptive filtering means.

4. Method as claimed in claim 3, wherein, to estimate the second order intermodulation power, the adaptive filtering means extracts the second order intermodulation signal included in the radio transceiver output signal by a convolution of the second order intermodulation reference signal with the radio transceiver output signal.

5. Method of suppression of second order intermodulation of reception means of a radio transceiver, the method comprising:
   injecting a transmit radiofrequency signal from an up converter of transmission means into a mixer of reception means;
   generating a second order intermodulation reference signal from a transmission baseband signal;
   estimating a second order intermodulation power from the second order intermodulation reference signal and a radio transceiver output signal;
   tuning a second order intermodulation intercept point corresponding to a lowest second order intermodulation power;
   extracting an optimum second order intermodulation intercept point corresponding to the lowest second order intermodulation power found; and
   subtracting the second order intermodulation signal from the radio transceiver output signal.

6. Method as claimed in claim 5, wherein the steps of estimating the second order intermodulation power, tuning the second order intermodulation intercept point, and extracting the optimum second order intermodulation intercept point are carried out in a closed loop.

7. Method as claimed in claim 5, wherein the transmit radiofrequency signal injected into the mixer of the reception means is modified according to gain parameters of the radio transceiver.

8. Method as claimed in claim 5, wherein the reception means includes a direct conversion receiver.

9. System of calibration of a second order intermodulation intercept point of a radio transceiver, the system comprising:
   generating means configured to generate a second order intermodulation reference signal from a transmission baseband signal,
   estimating means configured to estimate the second order intermodulation power from the second order intermodulation reference signal and a radio transceiver output signal, and
   extracting means configured to extract an optimum second order intermodulation intercept point corresponding to a lowest second order intermodulation power.

10. System as claimed in claim 9, wherein the generating means includes means to process square-law of the transmission baseband signal.

11. System as claimed in claim 9, wherein the estimating means includes adaptive filtering means.

12. System as claimed in claim 11, wherein the adaptive filtering means comprises means to calculate a convolution of the second order intermodulation reference signal with the radio transceiver output signal.

13. System of suppression of second order intermodulation of reception means of a radio transceiver, the system comprising:

injecting means configured to inject a transmit radiofrequency signal from an up converter of transmission means into a mixer of reception means, generating means configured to generate a second order intermodulation reference signal from a transmission baseband signal, estimating means configured to estimate the second order intermodulation power from the second order intermodulation reference signal and a radio transceiver output signal, extracting means configured to extract an optimum second order intermodulation intercept point corresponding to a lowest second order intermodulation power, and subtraction means configured to subtract the second order intermodulation signal extracted from the radio transceiver output signal to the radio transceiver output signal.

14. System as claimed in claim 13, wherein it includes a closed loop including said estimating means, said extracting means and a second order intermodulation intercept point tuner.

15. System as claimed in claim 13, wherein the injecting means are configured to modify the transmit radiofrequency signal injected into the mixer of the reception means according to gain parameters of the radio transceiver.

16. System as claimed in claim 13, wherein the reception means includes a direct conversion receiver.

\* \* \* \* \*